(No Model.)
H. J. BARRETT.
VEHICLE WHEEL.
No. 324,072. Patented Aug. 11, 1885.
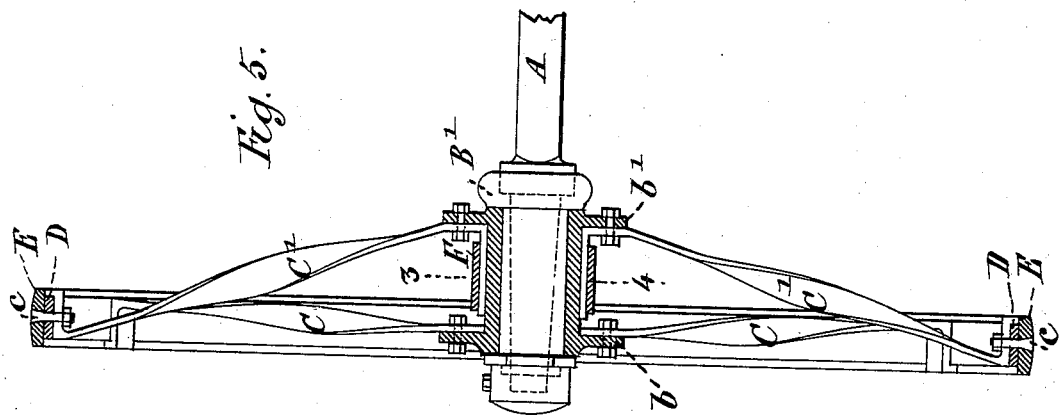
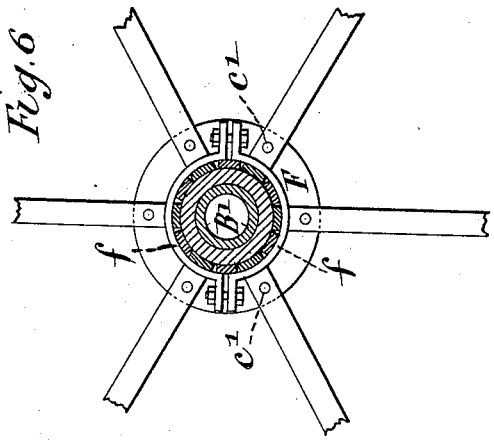

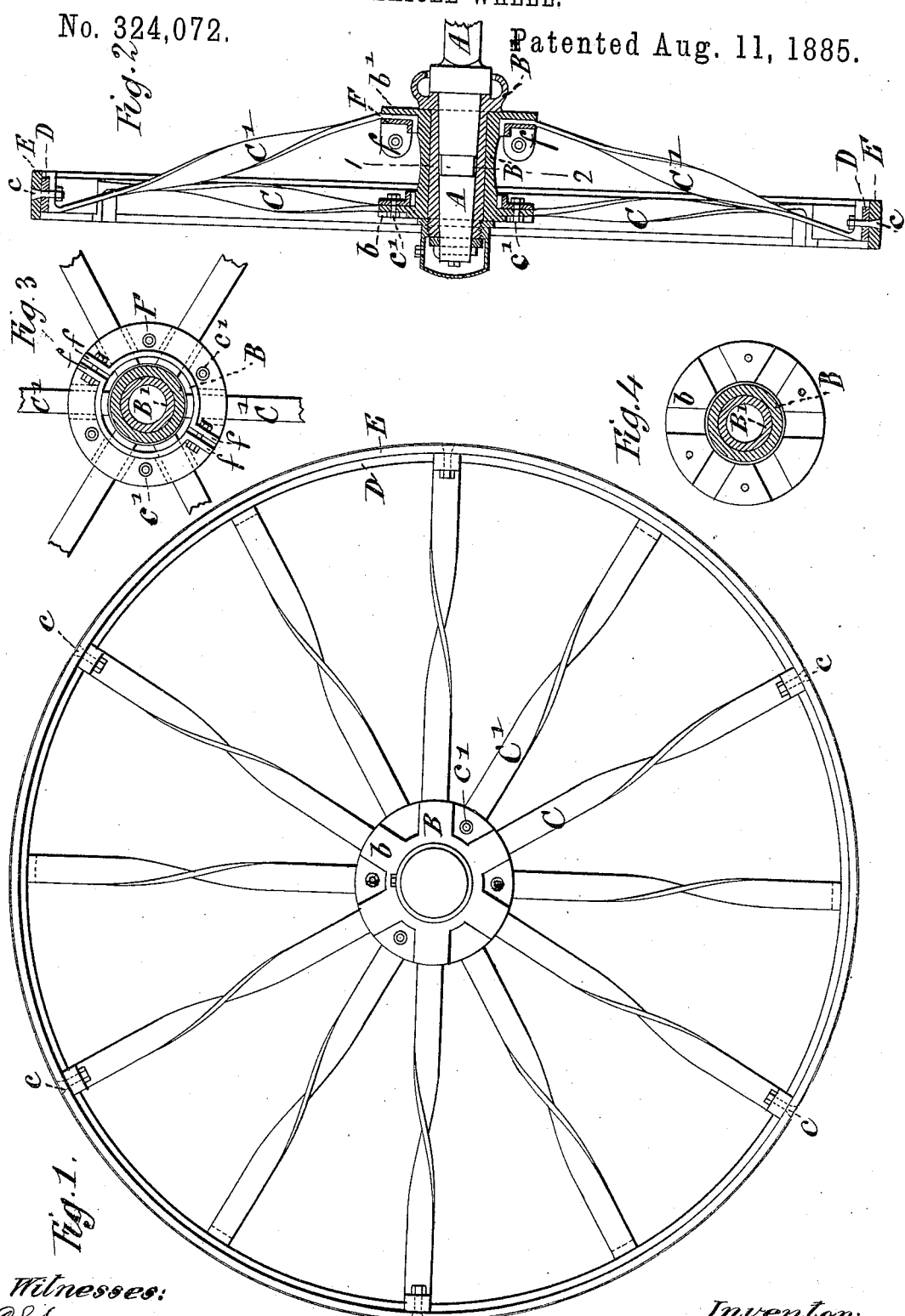

UNITED STATES PATENT OFFICE.

HENRY JOSEPH BARRETT, OF KINGSTON-UPON-HULL, COUNTY OF YORK, ENGLAND.

VEHICLE-WHEEL.

SPECIFICATION forming part of Letters Patent No. 324,072, dated August 11, 1885.

Application filed October 2, 1884. (No model.) Patented in England August 14, 1882, No. 3,878; Cape of Good Hope November 22, 1882, and Natal March 30, 1883.

*To all whom it may concern:*

Be it known that I, HENRY JOSEPH BARRETT, of Kingston-upon-Hull, in the county of York, England, commission merchant, have invented certain new and useful Improvements in the Construction of Wheels for Wagons and Other Vehicles, of which the following is a specification.

The object of this invention is to construct wheels which shall combine immense strength and a certain degree of elasticity with comparatively little weight, and be thereby specially suited for wagons and other vehicles in which heavy loads have to be carried over rough ground. This improved wheel is especially designed to withstand lateral wrenching strains.

To this end the invention relates to a wheel constructed entirely of metal, in which the felly is connected with the nave or boss by means of detachable spokes arranged obliquely, or alternately vertically and obliquely with respect to the nave or boss, and secured thereto by bolts and a metal strap or straps.

The peculiar construction and arrangement of the detachable spokes and the means for rapidly securing them in place or detaching them when they require renewal will be understood on reference to the accompanying drawings.

Figure 1 is a side elevation, seen from the outside, of a wheel constructed according to my invention. Fig. 2 is a vertical section thereof. Fig. 3 is a section through the hub on the line 1 2 of Fig. 2, showing the preferred mode of securing the detachable spokes thereto. Fig. 4 is a similar view, the spokes and metal straps for securing their ends in place being removed to show one flange of the hub. Fig. 5 illustrates in sectional elevation the mode of securing the inner ends of all the spokes in place by a single metal strap, and Fig. 6 is a section on the line 3 4 of Fig. 5.

In all these figures the same letters of reference indicate like or corresponding parts.

A is the axle; B, the nave or boss; B', the bush; C C', the detachable spokes; D, the felly or rim, and E the tire. The nave B is made of cast-steel, annealed, or of malleable cast-iron, and has flanges $b\ b'$ at its sides, with shallow radial recesses formed therein for the reception of a portion of the inner ends of the spokes. The bush B' is formed of metal cast upon a chill-pin, so that its inner surface is extremely hard, and this bush is keyed fast within the boss B in the ordinary manner. The detachable spokes C C' are formed of strips or bars of metal, preferably twisted, as shown, to give greater strength, while retaining a certain amount of elasticity. The spokes are arranged edgewise in the direction of the line of travel, or at right angles to the axis of the wheel, and are grouped in sets, those marked C in one set being vertical or nearly vertical with respect to the nave or boss, and those marked C' in the other set being mounted or set obliquely, or at a considerable inclination with respect to the nave or boss. The outer ends of the spokes are bent so as to lie flat against and support the rim or felly D, and their inner ends are also bent so as to fit snugly in the angle formed by the body of the nave B and its flanges $b\ b'$. The detachable spokes C C' are each, therefore, somewhat of scroll or Z shape, and when properly secured in place upon the nave and connected with the felly, they will support the felly elastically in a plane coinciding with the outer flange, $b$, of the nave B, or nearly so. The rim or felly D is made of a bar of mild steel or iron curved and welded to a circle, and the tire E is also of metal, with its outer surface of slightly-rounded form in cross-section. The outer ends of the spokes C C', where they support the rim or felly D, are each formed with a return or flange fitting alternately against the inner and outer edge of the rim. This helps the rim or felly D to resist lateral strains, which would put a shearing strain on the bolts $c$, which secure the spokes to the tire and rim. The rim or felly might be formed with a flange or flanges, to which the spokes might be bolted; but in that case separate bolts would be required to fasten the tire to the felly, whereas by bending the ends of the spokes horizontally or parallel to the tire I am able to secure all three parts together by the same bolts.

It will be observed that the bolts $c\ c$ used for attaching the outer ends of the spokes to the tire and felly are tapered and fit into holes of corresponding shape, so that their heads lie flush with the surface of the tire and hold it in place, notwithstanding the wearing away of the surface. The spokes C C' are secured in place upon the nave by means of a metal strap or straps, F, overlying their bent ends and holding them firmly down upon and against the body and flanges of the nave B. I preferably use a divided ring or strap of flanged or L shape in cross-section, as clearly shown in Figs. 2 and 3, for this purpose, the strap being made of semicircular halves bolted together through lugs $f\ f$, whereby a powerful grip can be put on the bent bases or ends of the spokes. The two portions of the divided ring or strap are also secured to the flanges $b\ b'$ of the nave B by bolts and nuts $c\ c'$, intermediate of the spokes, and by this means the spokes are firmly held in the shallow radial recesses of the said flanges, and are not weakened by the bolts passing through their inner ends. The body of the nave B between the ends of the spokes, when such ends are bent to the shape shown in Fig. 2, should be slightly dished, as shown, for the purpose of giving greater facility for detaching the spokes from their place against the flanges of the nave when it is required to remove one or more of them and substitute others. By this principle of construction great strength, combined with comparatively little weight, and a certain amount of elasticity are secured, the vertical spokes being capable of withstanding heavy downward thrusts and the obliquely-arranged spokes twisting and pulling strains; or, when both sets of spokes are mounted obliquely with respect to the axis of the wheel, dividing the said thrusts between them. Moreover, each spoke being fastened at both its ends bears an equal share of the strain, either in thrusting or pulling. A wheel thus constructed is practically indestructible; but should a spoke become bent or broken it can be taken out and replaced singly without interfering with the others in a few minutes. In this wheel the expansion and contraction are alike; consequently the tires have no need to be removed until they are worn out.

For securing the detachable spokes in place I preferably use bolts and lock-nuts, as they are not liable to work loose.

In Figs. 5 and 6 I have shown an alternative mode of securing the inner ends of the spokes C C' to the nave or boss B. In this case the bent ends or feet of the spokes extend across the body of the nave and nearly from flange to flange, and these feet or bent ends of the spokes are secured side by side upon and around the nave by a single broad band or strap, F, made in two semicircular halves, $f\ f$, bolted together, as shown in Fig. 6. In this case the spokes C C' are further bolted directly to the flanges $b\ b'$, respectively. The tapered extremities of the axle A fit truly within the bush B', and are held in position by a washer and linchpin, the latter being fixed by a set-screw. The endwise movement of the bush B' in the nave B is prevented by a washer and cap, which forms an oil-box—an arrangement which enables the wheel to be lubricated without removal from the axle. The inner end of the bush B' is cast hollow to catch the lubricant as it runs out.

By twisting the strips of metal constituting the spokes I obtain greater strength, while retaining sufficient elasticity in the wheel for all ordinary purposes.

If desired, the felly D and tire E may be made, for convenience of packing and transport, in three or four separate segments properly fished together.

Having now described my invention and the manner of carrying the same into effect, I claim—

1. A wheel having detachable metal spokes C C', with ends bent over laterally and connecting the nave or boss B with the rim or felly D, the spokes being arranged in two series, one of which series is set on an incline with reference to the plane of motion of the wheel, and the spokes of the two series being secured to the nave or boss by detachable divided metal straps encircling the nave or boss and the bent ends of the spokes, substantially as set forth.

2. A metal wheel having detachable spokes C C' connecting the nave or boss B with the rim or felly D, and having their inner ends bent over laterally, one set or series of spokes being vertical, or nearly so, and the other set being mounted obliquely with respect to the nave or boss and detachable, and divided metal straps encircling the nave or boss and the bent ends of the spokes, for securing the ends of the said spokes in place, substantially as set forth.

3. In a wheel, the combination, with a flanged nave or boss, B, rim D, and tire E, of the detachable semi-elastic spokes C C', formed of twisted strips or bars of metal, bolts $c\ c'$, uniting the ends of each spoke to the rim and nave, respectively, and a strap or straps, such as F, for clamping the feet or inner ends of the said spokes upon and against the nave B, substantially as and for the purpose set forth.

4. In a wheel, the combination, with the metal nave B, felly D, and tire E, of the detachable spokes C C', secured alternately to opposite sides of the nave or boss and connecting the felly with the said nave, the said spokes having bent and flanged outer ends, which fit against the edge of the felly, and bolts $c\ c$ with taper-heads uniting each spoke with the rim and tire, and means, substantially as described, for securely clamping the inner ends of the detachable spokes to the nave B, as and for the purpose set forth.

HY. J. BARRETT.

Witnesses:
  THOS. W. HEARFIELD,
    *Notary Public, Hull.*
  BERNARD I. RENGROSE,
    *His Clerk.*